A. SMITH.
METHOD OF MANUFACTURING LIME AND CEMENT.

No. 174,387. Patented March 7, 1876.

3 Sheets—Sheet 2.

A. SMITH.
METHOD OF MANUFACTURING LIME AND CEMENT.

No. 174,387. Patented March 7, 1876.

Witnesses:

INVENTOR

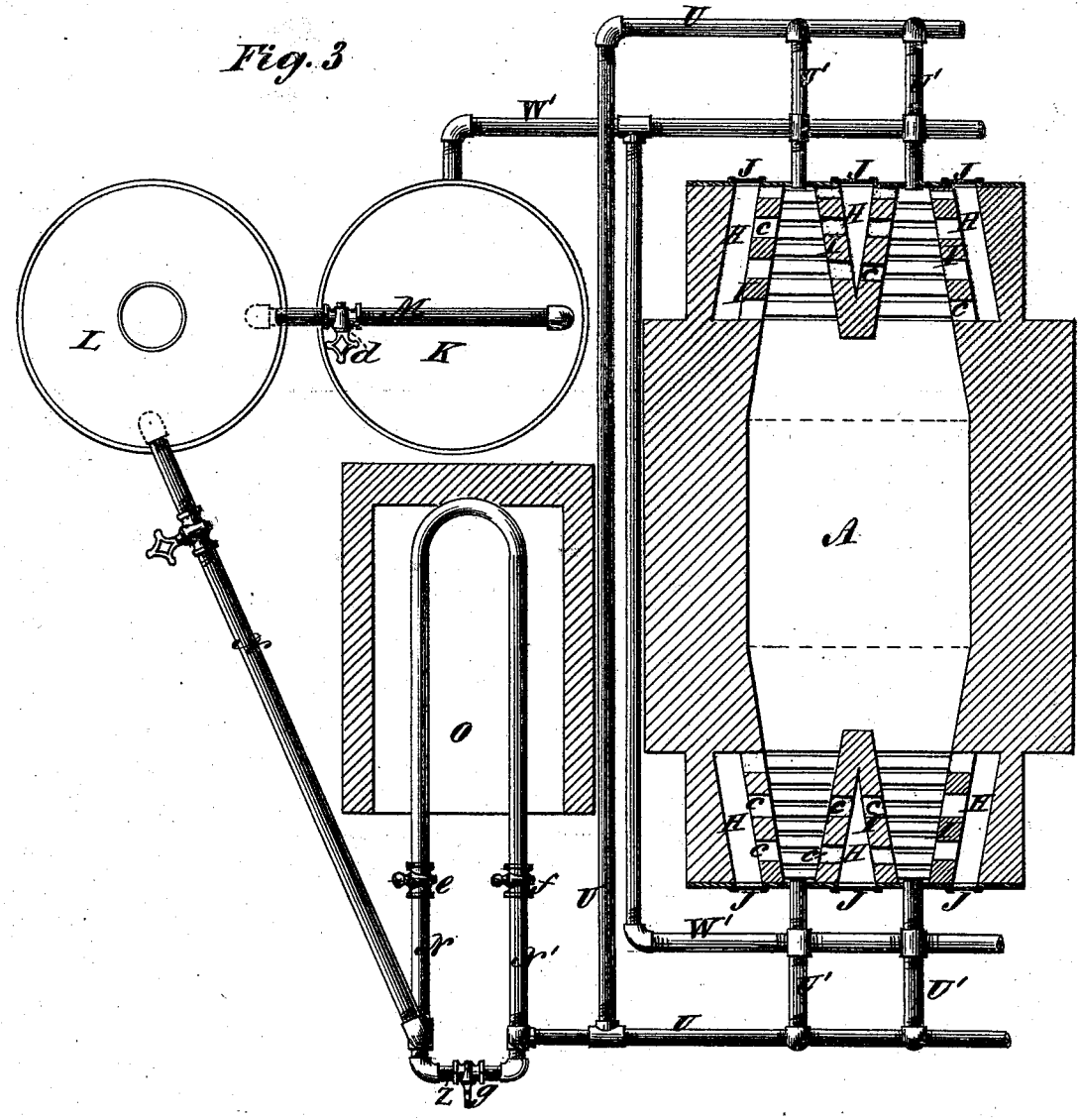

UNITED STATES PATENT OFFICE.

ANANIAS SMITH, OF BUFFALO, NEW YORK.

IMPROVEMENT IN METHODS OF MANUFACTURING LIME AND CEMENT.

Specification forming part of Letters Patent No. 174,387, dated March 7, 1876; application filed February 23, 1876.

*To all whom it may concern:*

Be it known that I, ANANIAS SMITH, of the city of Buffalo, county of Erie and State of New York, have invented certain new and useful Improvements in the Art of Manufacturing Lime and Cement; and I do hereby declare the following to be a full, clear, and exact description of the same, reference being had to the accompanying drawings forming a part of this specification.

Heretofore the calcination of lime by the use of coal, which is the principal fuel used, has been attended by great loss of such fuel, and the lime produced has been irregular and deteriorated in quality. This is owing to the difference in the quality and quantity of coal consumed in a given time, the impossibility of controlling the combustion so as to insure an even degree of heat, which is necessary to prevent the product being under or over burnt, and to adapt the heat to the lime or cement rock to be calcined, which, as is well known, requires a variation in the degree of heat as it varies in hardness and other qualities; and the deterioration in the quality of the lime by the action of the sulphur in the coal, and by the mingling of ashes therewith. These objections also exist to a certain extent when wood is used as fuel.

The object of my invention is to obviate these objections, by producing a perfect combustion and a uniform heat absolutely controllable at will, which enables me to produce and maintain a greater or less degree of heat at pleasure, according to the nature of lime or cement rock to be calcined, and other conditions, insuring an even calcination from a liquid fuel which does not deteriorate the quality of lime or cement.

My invention consists as improvements in the art of manufacturing lime and cement—essentially in the method of manufacturing lime or cement at a single operation and producing an even quality of the same, which consists in subjecting the lime or cement rock to the action of heat produced by the active combustion of liquid fuel or vapor produced therefrom, associated with steam, superheated or not, and air, as will be hereinafter more fully described and claimed.

In the accompanying drawing, forming a part of this specification, I have shown an apparatus, by means of which my invention may be carried out.

Figure 1:
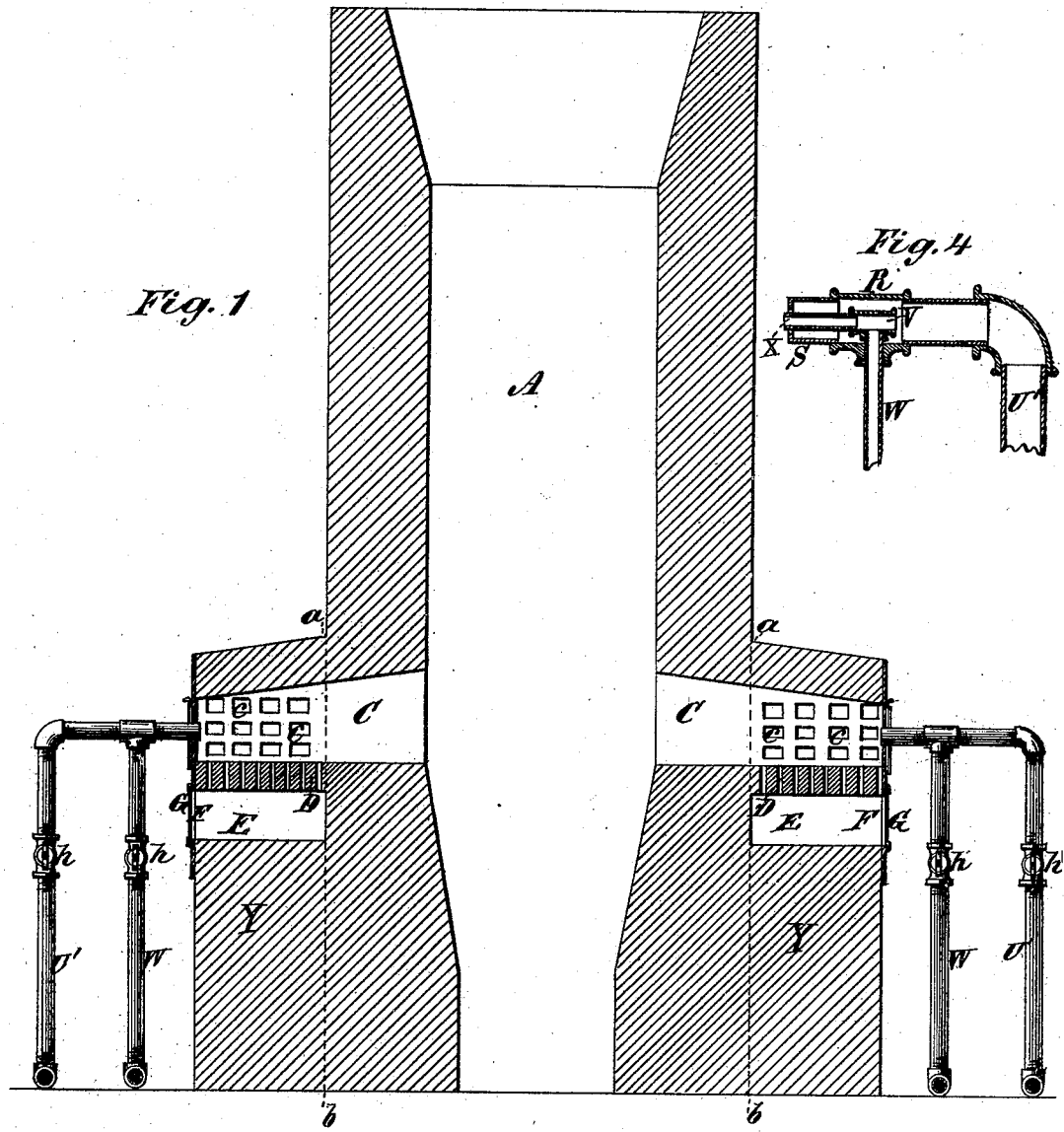
Figure 2:
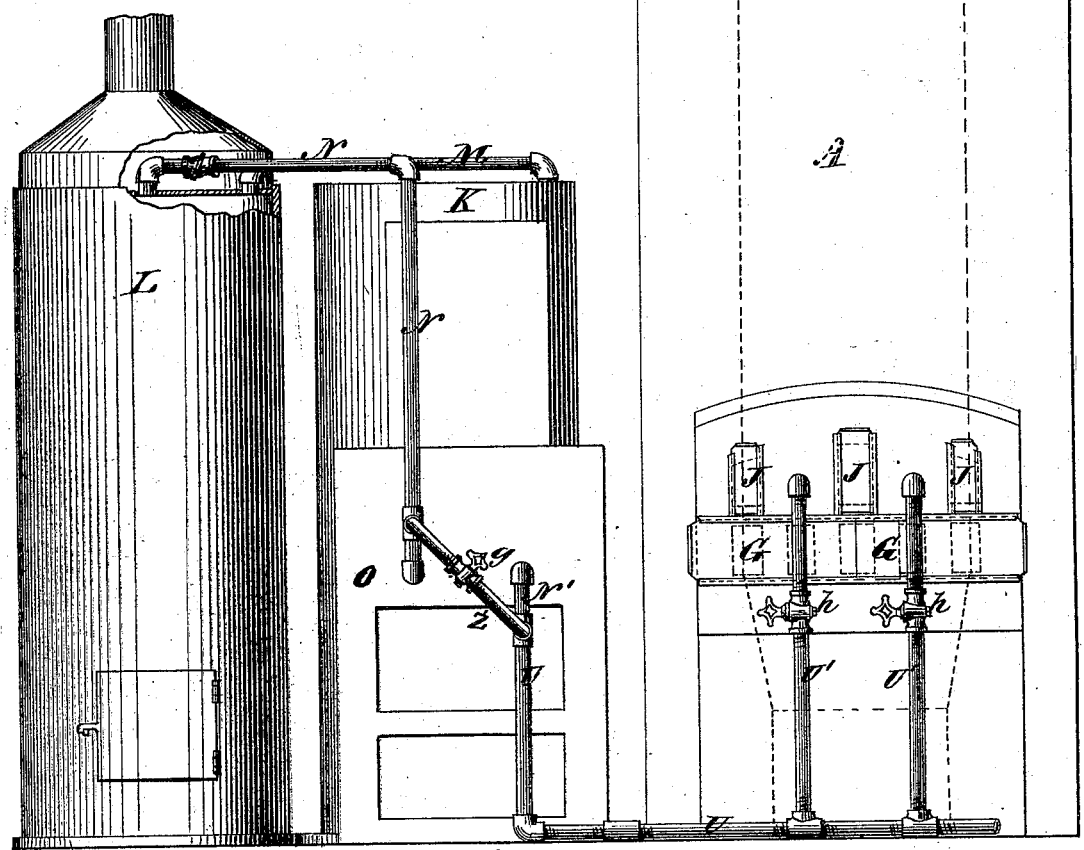

Figure 1 is a vertical section of a limekiln, having peculiar combustion-chambers, and showing means for supplying liquid fuel, or vapor produced therefrom, steam, and air thereto. Fig. 2 is a front elevation of the same. Fig. 3 is a horizontal section of the same, showing also a steam-boiler tank for containing liquid fuel in vapor produced therefrom, and a superheater. Fig. 4 is a detached vertical section of one construction of pipes for introducing steam and liquid fuel or vapor produced therefrom into the combustion-chamber.

A is the shaft of a limekiln, of any desired and well-known form. This in kilns in which wood is consumed usually has one or more apertures, in which the wood is burned, which extend from the line *a b* to the walls of the shaft. These apertures I extend by means of a brick or other addition, Y, so as to form combustion-chambers C. Each of these is provided with a perforated fire-brick or other grate-surface, D, beneath which is an air-chamber, E, communicating through aperture F, which may be or not controlled by dampers G with the outside of the kiln.

H are air-chambers formed in the addition Y, extending upward on each side of the combustion-chamber C, and communicating therewith through apertures *c* in the walls I. These apertures should be at least one fourth of the area of the walls I, where they form the sides of the combustion-chamber, in order that the air may readily and freely pass into the latter. The quantity of air entering these air-chambers may be controlled by dampers J, if desired. These air-chambers H may connect with the air-chambers E, or be independent thereof, and one of them may be employed with each combustion-chamber, though I prefer to use two, as shown. L is a steam-boiler of any well-known construction. K is a tank containing liquid fuel, or vapor produced therefrom, made sufficiently strong to withstand the same pressure as the steam-boiler. This tank may be supplied with liquid fuel or vapor produced therefrom by any of the well-known methods or means in common use. A pipe, M, connects the boiler with the tank K, in order that the steam-pressure may be used to force the liquid fuel or vapor produced therefrom out of said tank, through pipes W W', hereinafter described, into the combustion chamber or chambers. A cock, $d$, is provided in this pipe to shut off communication with the boiler while steam is being raised, or for other purposes, and control the pressure in said tank. A pipe, N, extends from the steam-boiler and connects with a superheater, O, provided with cocks $e f$. A pipe, N', connects said superheater with a pipe, U. These pipes N and N' are also connected by a pipe, Z, provided with a cock, $g$. By closing the cock $g$ and opening cocks $e f$ the steam is made to pass through the superheater. By opening cock $g$ and closing $e f$ it is made to pass directly to the pipe U. This latter pipe has connected to it a series of pipes, U', one for each combustion-chamber. Each of these pipes is provided with a T-connection, R, which is connected to its combustion-chamber by means of a pipe, S, contracted at its outer end, which fits into the outer wall of the combustion-chamber, and extends through the same. Within each of the connections R is a smaller T-connection, V, which receives a pipe, W, connected directly, through pipe W', with the tank K. A small pipe, X, extends from one end of the connection V, through the aperture in the end of the pipe S, an annular space being left between it and the said aperture, through which steam may issue. The other end of the connection V is left open.

Each of the pipes U' and W is provided with a cock, $h$, to control the passage of the steam and liquid fuel, or vapor produced therefrom.

In the drawing I have shown four combustion-chambers, two on each side of the kiln, and this is the number for large kilns that I prefer to use. A larger number may, however, be employed for large kilns, or a smaller number for small kilns, each of which being provided with an air-chamber or air-chambers H and E, either with or without dampers to regulate the quantity of air, and each having connected therewith a pipe, S, provided with T-connections R V, and pipes to supply steam and liquid fuel or their substantial equivalents.

Operation: The shaft having been filled with lime or cement rock, a small fire is kindled in each of the combustion-chambers. The cocks $h$ and the dampers G J are then opened, and, steam previously raised in the boiler, liquid fuel, or vapor produced therefrom, and air, enter and associate in the combustion-chamber, in which an active combustion takes place, the intense heat therefrom acting upon the rock and calcining the same.

The lime thus produced falls down, free from sulphur or ashes, and is removed in the ordinary manner.

By means of the liquid fuel or vapor produced therefrom, associated with steam, either superheated or at any temperature or pressure, and air in the combustion-chamber, I am enabled to produce and maintain a perfect combustion and a uniform heat, which, by means of the cocks and dampers, is absolutely controllable at will, as the nature of the lime or cement rock or other conditions requires.

The steam passes with the liquid fuel or vapor produced therefrom through the connection V and pipe X, as well as through the pipe S, into the combustion-chamber. It and the liquid fuel or vapor produced therefrom may, however, pass through independent pipes brought in close proximity in the combustion-chamber, or the fuel and steam pipes may be joined, and the fuel and steam pass through the same pipe into the combustion-chamber.

In some of these cases where liquid fuel is used it is vaporized. In some it is sprayed, and in others it becomes a spray and vapor mixed before reaching the combustion-chamber—depending somewhat upon the distance the fuel and steam travel together in the pipes, and upon the temperature and pressure of the steam.

The air which supplies the combustion-chamber may also be heated if found desired, or controlled by a blast.

Although I have described the above apparatus for carrying out my invention, I do not confine myself to its exact construction, as it may be varied without departing from my invention.

Any liquid fuel or vapor produced therefrom which is free from sulphur will answer, although I prefer to use petroleum or other liquid hydrocarbons or vapor produced therefrom, on account of their comparative cheapness.

By means of my improvement lime or cement rock is calcined at one operation, so as to produce an even quality of lime, free from ashes or sulphur, with such regularity that the product of a limekiln with my improvement is increased four hundred per cent. over one of the same size constructed in the ordinary manner in which coal or wood is used.

No smoke is produced to annoy the workmen and the neighborhood, and deteriorate the quality of the lime. The cost of the fuel is reduced by reason of the complete control of the draft and of the fuel employed, and the perfect combustion induced in the combustion-chamber of said fuel, associated with steam and air.

Having thus fully described my invention, what I claim as new, and desire to secure by Letters Patent, is—

The method of manufacturing lime or cement at a single operation, and producing an even quality of the same, which consists in subjecting the lime or cement rock to the action of heat, produced by the active combustion of the described liquid fuel or vapor produced therefrom, associated with steam, superheated or not, and air, substantially as specified.

In testimony whereof I have signed my name to this specification in the presence of two subscribing witnesses.

ANANIAS SMITH.

Witnesses:
M. B. PHILIPP,
C. H. RIDENOUR.